United States Patent
Zhang et al.

(10) Patent No.: US 12,394,185 B2
(45) Date of Patent: Aug. 19, 2025

(54) CROSS DOMAIN SEGMENTATION WITH UNCERTAINTY-GUIDED CURRICULUM LEARNING

(71) Applicant: Siemens Healthineers AG, Forchheim (DE)

(72) Inventors: Yue Zhang, Jersey City, NJ (US); Caius Constantin Suliman, Brasov (RO); Florin-Cristian Ghesu, Baiersdorf (DE); Rui Liao, Princeton Junction, NJ (US)

(73) Assignee: Siemens Healthineers AG, Forchheim (DE)

( * ) Notice: Subject to any disclaimer, the term of this patent is extended or adjusted under 35 U.S.C. 154(b) by 424 days.

(21) Appl. No.: 18/058,884

(22) Filed: Nov. 28, 2022

(65) Prior Publication Data

US 2024/0177458 A1    May 30, 2024

(51) Int. Cl.
*G06V 10/774* (2022.01)
*G06T 7/00* (2017.01)
*G06V 10/26* (2022.01)

(52) U.S. Cl.
CPC .......... *G06V 10/774* (2022.01); *G06T 7/0012* (2013.01); *G06V 10/26* (2022.01); *G06T 2207/30168* (2013.01); *G06V 2201/03* (2022.01)

(58) Field of Classification Search
CPC .. G06V 10/774; G06V 10/26; G06V 2201/03; G06V 10/82; G06T 7/0012; G06T 2207/30168
See application file for complete search history.

(56) References Cited

U.S. PATENT DOCUMENTS

2019/0147298 A1* 5/2019 Rabinovich ............ G06N 3/045
                                                            382/157
2020/0160177 A1* 5/2020 Durand ............... G06F 16/9024
(Continued)

OTHER PUBLICATIONS

Tajbakhsh, Nima, et al. "Embracing imperfect datasets: A review of deep learning solutions for medical image segmentation." Medical image analysis 63:101693. (Year: 2020).*

(Continued)

*Primary Examiner* — Ross Varndell

(57) ABSTRACT

Systems and methods for training a machine learning based segmentation network are provided. A set of medical images, each depicting an anatomical object, in a first modality is received. For each respective medical image of the set of medical images, a synthetic image, depicting the anatomical object, in a second modality is generated based on the respective medical image. One or more augmented images are generated based on the synthetic image. One or more segmentations of the anatomical object are performed from the one or more augmented images using a machine learning based reference network. An uncertainty associated with segmenting the anatomical object from the respective medical image is computed based on results of the one or more segmentations. It is determined whether the respective medical image is suitable for training a machine learning based segmentation network based on the uncertainty. The machine learning based segmentation network is trained based on 1) the suitable medical images of the set of medical images and 2) annotations of the anatomical object determined using a machine learning based teacher network.

20 Claims, 11 Drawing Sheets

(56) References Cited

U.S. PATENT DOCUMENTS

| | | | |
|---|---|---|---|
| 2021/0150710 A1* | 5/2021 | Hosseinzadeh Taher | ................... |
| | | | G06V 10/764 |
| 2022/0114444 A1* | 4/2022 | Weinzaepfel | .......... G06N 3/084 |
| 2023/0046321 A1* | 2/2023 | Vilsmeier | .............. G06V 10/82 |
| 2023/0169332 A1* | 6/2023 | Karthik | .................. G06N 3/045 |
| | | | 706/25 |
| 2023/0267611 A1* | 8/2023 | Shi | ........................... G06T 7/11 |
| | | | 382/159 |
| 2023/0316544 A1* | 10/2023 | Amadou | ................... G06T 7/74 |
| | | | 382/128 |

OTHER PUBLICATIONS

Yu, Lequan, et al. "Uncertainty-aware self-ensembling model for semi-supervised 3D left atrium segmentation." Medical image computing and computer assisted intervention—MICCAI 2019: 22nd international conference, Shenzhen, China, Oct. 13-17, 2019. (Year: 2019).*

Extended European Search Report (EESR) mailed May 23, 2023 in corresponding European Patent Application No. 22209867.5.

Zhang, Zizhao, Lin Yang, and Yefeng Zheng. "Translating and segmenting multimodal medical volumes with cycle-and shape-consistency generative adversarial network." Proceedings of the IEEE Conference on Computer Vision and Pattern Recognition. 2018.

Yu Lequan et al: "Uncertainty-Aware Self-ensembling Model for Semi-supervised 3D Left Atrium Segmentation", Oct. 10, 2019, 16th European Conference—Computer Vision—ECCV 2020, Cornell University Library, pp. 605-613, XP04 7522653.

Tajbakhsh Nima et al: "Embracing Imperfect Datasets: A Review of Deep Learning Solutions for Medical Image Segmentation", arxiv. org, Cornell University Library, Aug. 27, 2019, XP08159752.

Dosovitskiy et al., "An image is worth 16x16 words: Transformers for image recognition at scale", arXiv:2010.11929, 2020, pp. 1-21.

Suetens et al., "Fundamentals of Medical Imaging, Third Edition", Cambridge University Press, 2017, pp. 8-14, 30, 45-46 and 58, ISBN 978-1-107-15978-5.

Loshchilov et al., "Decoupled weight decay regularization", arXiv:1711. 05101, 2017, pp. 1-19.

London Department of Health, NHS Improvement, "Diagnostic imaging dataset statistical release", 2016, pp. 1-17.

Wang et al., "COVID-Net: A tailored deep convolutional neural network design for detection of COVID-19 cases from chest X-ray images", Scientific Reports, 2020, 12 pgs.

Hoffman et al., "CyCADA: Cycle-consistent adversarial domain adaptation", International Conference on Machine Learning, 2018, pp. 1-15.

Zhang et al., "Unsupervised X-ray image segmentation with task driven generative adversarial networks", Medical Image Analysis, 2020, pp. 1-15.

Li et al., "Dual-teacher: Integrating intra-domain and inter-domain teachers for annotation-efficient cardiac segmentation", arxIV:2007. 06279v1, 2020, 10 pgs.

Zheng et al., "Pairwise domain adaptation module for CNN-based 2-D/3-D Registration", Journal of Medical Imaging, 2018, pp. 021204-1-021204-10.

Chen et al., "Synergistic image and feature adaptation: Towards cross-modality domain adaptation for medical image segmentation", Proceedings of the AAAI Conference on Artificial Intelligence, 2019, pp. 865-872.

Xu et al., "Cross-site severity assessment of COVID-19 from CT images via Domain Adaptation", IEEE Transactions on Medical Imaging, 2021, pp. 1-15.

Chang et al., "All about structure: Adapting structural information across domains for boosting semantic segmentation", Proceedings of the IEEE/CVF Conference on Computer Vision and Pattern Recognition, 2019, pp. 1-10.

Cui et al., "Structure-driven unsupervised domain adaptation for cross-modality cardiac segmentation", IEEE Transactions on Medical Imaging, 2021, pp. 3604-3616.

Salimans et al., "Improved techniques for training GANs", Advances in Neural Information Processing Systems, 2016, 9 pgs.

Tarvainen et al., "Mean teachers are better role models: Weight-averaged consistency targets improve semi-supervised deep learning results", Advances in Neural Information Processing Systems, 2017, pp. 1-16.

Laine et al., "Temporal ensembling for semi-supervised learning", arXiv:1610.02242, 2016, pp. 1-13.

Chen et al., "Improved baselines with momentum contrastive learning", arXiv:2003.04297, 2020, pp. 1-3.

Grill et al., "Bootstrap your own latent a new approach to self-supervised learning", Advances in Neural Information Processing Systems, 2020, pp. 1-35.

Chen et al., "Exploring Simple Siamese Representation Learning", Proceedings of the IEEE/CVF Conference on Computer Vision and Pattern Recognition, 2021, pp. 1-10.

Ghesu et al., "Self-supervised learning from 100 million medical images", arXiv:2201.01283, 2022, pp. 1-13.

Ruijters et al., "GPU-accelerated digitally reconstructed radiographs", BioMED: Proceedings of the Sixth IASTED International Conference on Biomedical Engineering, 2008, 5 pgs.

Bengio et al., "Curriculum Learning", Proceedings of the 26th Annual International Conference on Machine Learning, 2009, 8 pgs.

Arjovsky et al., "Towards principled methods for training generative adversarial networks", arXiv:1701.04862, 2017, pp. 1-16.

Roth et al., "Stabilizing training of generative adversarial networks through regularization", Advances in Neural Information Processing Systems, 2017, pp. 1-16.

Zhu et al., "Unpaired image-to-image translation using cycle-consistent adversarial networks", Proceedings of the IEEE International Conference on Computer Vision, 2017, pp. 1-25.

J'egou et al., "The one hundred layers tiramisu: Fully convolutional denseNets for semantic segmentation", Computer Vision and Pattern Recognition Workshops, 2017, pp. 1-9.

Wang et al., "DiCyc: GAN-based deformation invariant cross-domain information fusion for medical image synthesis", Information Fusion, 2021, pp. 147-160.

Cubuk et al., "RandAugment: Practical automated data augmentation with a reduced search space", Proceedings of the IEEE/CVF Conference on Computer Vision and Pattern Recognition Workshops, 2020, pp. 1-12.

Demner-Fushman et al., "Preparing a collection of radiology examinations for distribution and retrieval", Journal of the American Medical Informatics Association, 2016, pp. 304-310.

Shiraishi et al., "Development of a digital image database for chest radiographs with and without a lung nodule: receiver operating characteristic analysis of radiologists' detection of pulmonary nodules", American Journal of Roentgenology, 2000, pp. 71-74.

You et al., "Towards accurate model selection in deep unsupervised domain adaptation", International Conference on Machine Learning, PMLR, 2019, 10 pgs.

* cited by examiner

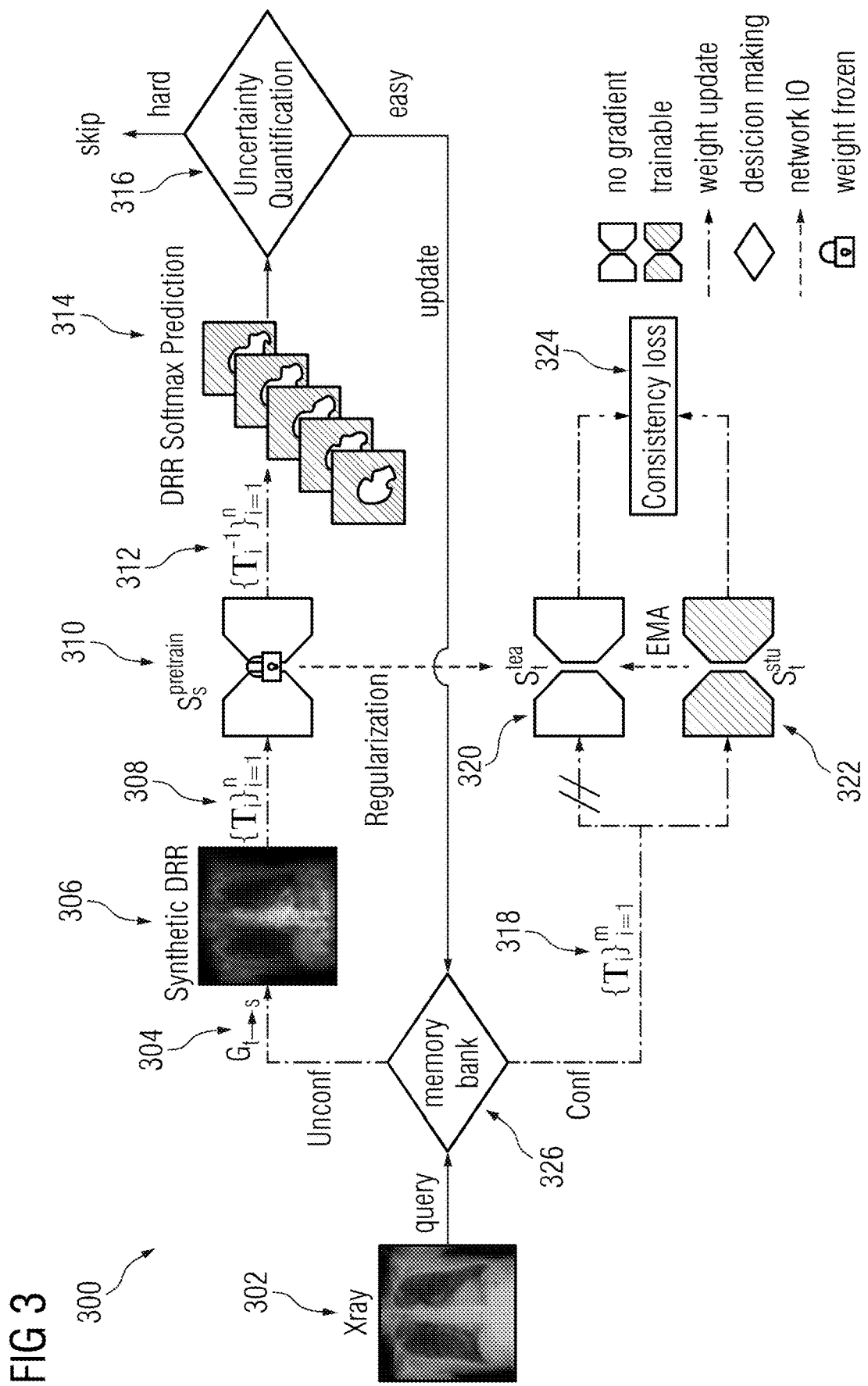

Algorithm 1: WToS Algorithm

---

Data: Labeled source data $\{x_s, y_s\}$, unlabeled target data $\{x_t\}$

Hyperparams: source uncertainty tolerance $\tau_u$, $\tau_u$'s linear increasing rate $\lambda_u$, source-target, disagreement tolerance $\tau_{ts}$, $\tau_{ts}$'s linear increasing rate $\lambda_{ts}$, augmentation times n and m, EPOCHS, exponential moving average param $\alpha$, $\beta$.

1. TD-GAN stage
2. i. Train a denseUNet on source domain segmentation $S_s^{pretrain}$.
3. ii. Train TD-GAN with $S_s^{pretrain}$ weight frozen, get trained generator $G_{t \rightarrow s}$.
4. Curriculum learning stage
5. Initialize $S_t^{tea}$, $S_t^{stu}$ from $S_s^{pretrain}$;
6. for ep=1, 2, ... to EPOCHS do
7.     for i=1, 2... do     // at each training step
8.         for $x_t$ in batch do     // each image in batch
9.             SP = $[T^{-1} S_s^{pretrain} (T(G_{t \rightarrow s}(x_t)))$for_in range(n)]
10.             $U(x_t) = \max_{p \in SP} D(p - E\{SP\})$;     // uncertainty quan.
11.             if $U(x_t) <= \tau_u$ then
12.                 ST = $D(S_t^{tea}(x_t), S_s^{pretrain}(G_{t \rightarrow s}(x_t)))$;
13.                 if $ST \leq \tau_{ts}$ then
14.                     $L(x_t) = \sum_{i=1}^{m} D(H(S_t^{tea}(T_i(x_t))), S_t^{stu}(T_i(x_t)))$ // consistency loss
15.             end
16.         end
17.     end
18.     batch loss backpropagation;
19.     $\theta_t^{tea,(i)} = (1-\alpha-\beta)\theta_t^{tea,(i-1)} + \alpha\theta_t^{stu,(i)} + \beta\theta_s^{pretrain}$; // Weight EMA
20.     $\tau_u = \tau_u + \lambda_u$;
21.     $\tau_{ts} = \tau_{ts} + \lambda_{ts}$;
22.     end
23. end

┌─────────────────────────────────────┐
    │ Receive an input medical image      │
    │ depicting an anatomical object      │──602
    └─────────────────────────────────────┘
                         │
                         ▼
    ┌─────────────────────────────────────┐
    │ Perform a segmentation of the       │
    │ anatomical object from the input    │──604
    │ medical image using a trained       │
    │ machine learning based segmentation │
    │ network                             │
    └─────────────────────────────────────┘
                         │
                         ▼
    ┌─────────────────────────────────────┐
    │ Output results of the segmentation  │──606
    └─────────────────────────────────────┘
```

|      | Vanilla       | TD-GAN        | Present Embodiments | Supervised    |
|------|---------------|---------------|---------------------|---------------|
| Dice | 0.78 ± 0.15   | 0.81 ± 0.16   | 0.92 ± 0.05         | 0.94 ± 0.03   |
| HD   | 55.52 ± 29.21 | 19.45 ± 7.33  | 11.76 ± 6.72        | 8.12 ± 3.89   |
| ASD  | 17.00 ± 11.18 | 7.64 ± 2.74   | 3.39 ± 1.88         | 2.33 ± 1.19   |

FIG 9
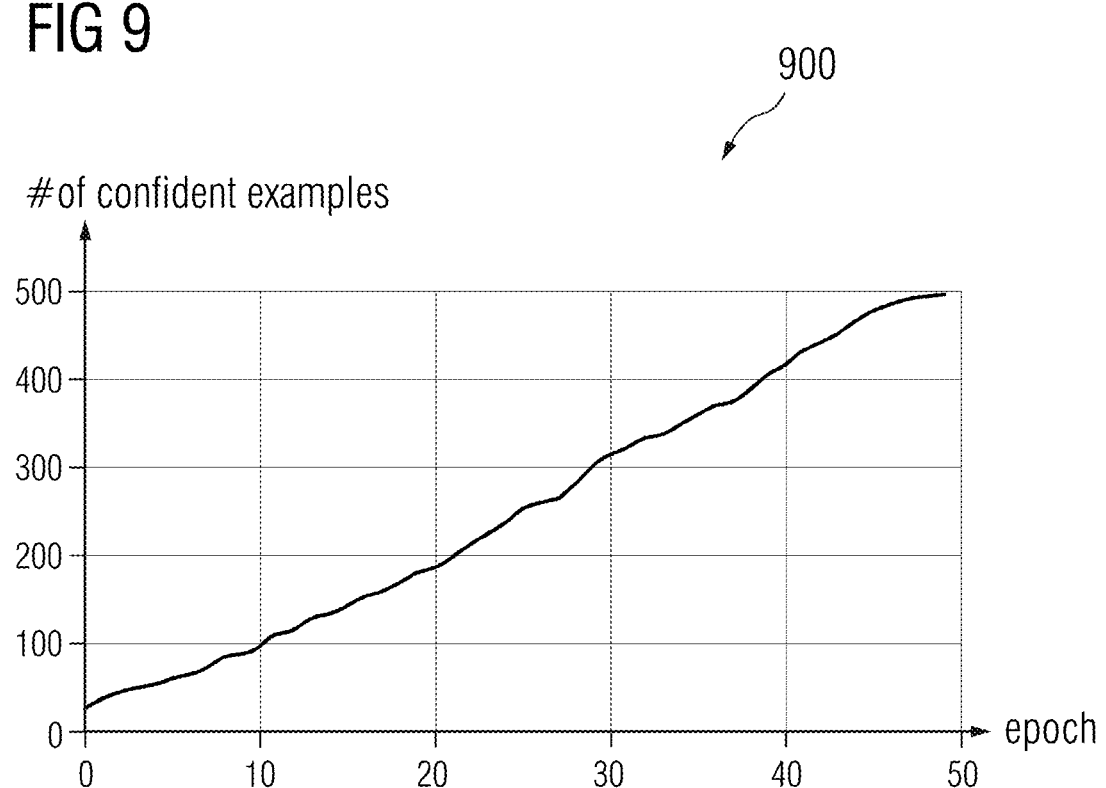
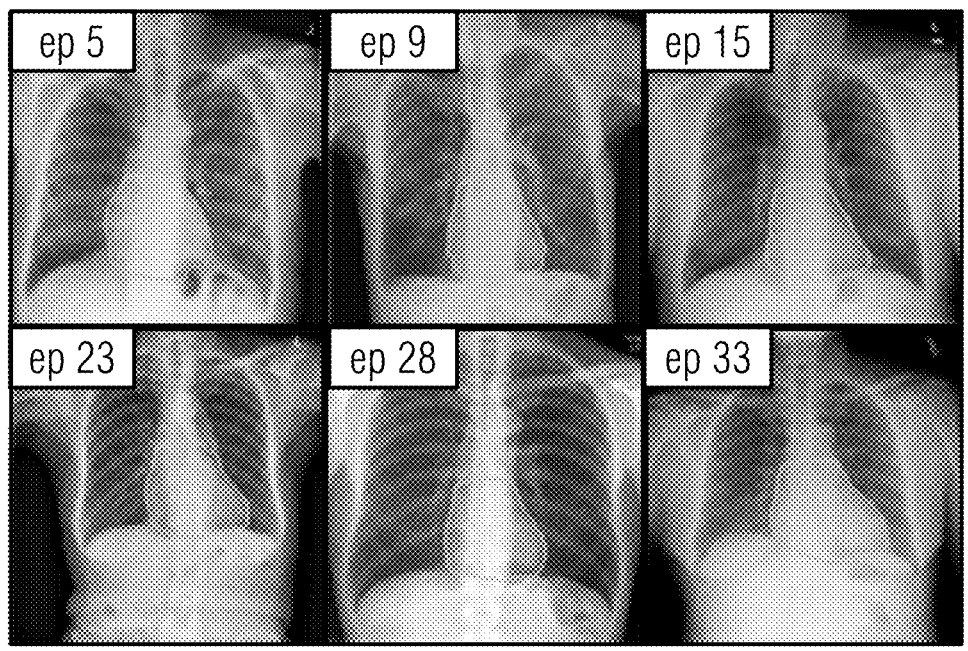

CROSS DOMAIN SEGMENTATION WITH UNCERTAINTY-GUIDED CURRICULUM LEARNING

TECHNICAL FIELD

The present invention relates generally to medical image segmentation, and in particular to cross domain segmentation with uncertainty-guided curriculum learning.

BACKGROUND

Deep neural networks have been widely applied in medical imaging analysis for performing a variety of clinical tasks. One important clinical task is medical image segmentation. Conventionally, training deep neural networks for medical image segmentation requires large amounts of annotated training data to avoid overfitting. However, annotating such training data is a difficult, expensive, and time-consuming task which requires extensive clinical expertise. Accordingly, obtaining annotated training data at a large enough scale for training deep neural networks is a substantial challenge.

BRIEF SUMMARY OF THE INVENTION

In accordance with one or more embodiments, systems and methods for training a machine learning based segmentation network are provided. A set of medical images, each depicting an anatomical object, in a first modality is received. For each respective medical image of the set of medical images, a synthetic image, depicting the anatomical object, in a second modality is generated based on the respective medical image. One or more augmented images are generated based on the synthetic image. One or more segmentations of the anatomical object are performed from the one or more augmented images using a machine learning based reference network. An uncertainty associated with segmenting the anatomical object from the respective medical image is computed based on results of the one or more segmentations. It is determined whether the respective medical image is suitable for training a machine learning based segmentation network based on the uncertainty. The machine learning based segmentation network is trained based on 1) the suitable medical images of the set of medical images and 2) annotations of the anatomical object determined using a machine learning based teacher network.

In one embodiment, it is determined whether the respective medical image is suitable for training a machine learning based segmentation network by comparing the uncertainty with a threshold. The generating, the performing, the computing, the determining, and the training steps are repeated for a plurality of epochs and the threshold is updated after each of the plurality of epochs.

In response to determining that the respective medical image is suitable for training the machine learning based segmentation network, a counter representing a frequency that the respective medical image has been determined as being suitable for training the machine learning based segmentation network is updated. During a next epoch, it is determined whether the respective medical image is suitable for training the machine learning based segmentation network based on the counter. The machine learning based segmentation network is trained based on the respective medical image determined to be suitable for training the machine learning based segmentation network based on the counter.

In one embodiment, the one or more segmentations are performed by applying one or more transformations to the synthetic image to generate the one or more augmented images. A segmentation of the anatomical object from each of the one or more augmented images is performed.

In one embodiment, the uncertainty is computed by quantifying a quality of each of the one or more segmentations. An average quality is calculated based on the quality of each of the one or more segmentations. A maximum deviation of a distance between the quality of each of the one or more segmentations and the average quality.

In one embodiment, the machine learning based segmentation network is trained based on one or more additional annotated medical images.

In accordance with one embodiment, systems and methods for medical image segmentation are provided. An input medical image depicting an anatomical object is received. A segmentation of the anatomical object from the input medical image is performed using a trained machine learning based segmentation network. Results of the segmentation are output. The trained machine learning based network is trained by receiving a set of medical images, each depicting an anatomical object, in a first modality. For each respective medical image of the set of medical images, a synthetic image, depicting the anatomical object, in a second modality is generated based on the respective medical image. One or more augmented images are generated based on the synthetic image. One or more segmentations of the anatomical object are performed from the one or more augmented images using a machine learning based reference network. An uncertainty associated with segmenting the anatomical object from the respective medical image is computed based on results of the one or more segmentations. It is determined whether the respective medical image is suitable for training a machine learning based segmentation network based on the uncertainty. The machine learning based segmentation network is trained based on 1) the suitable medical images of the set of medical images and 2) annotations of the anatomical object determined using a machine learning based teacher network.

These and other advantages of the invention will be apparent to those of ordinary skill in the art by reference to the following detailed description and the accompanying drawings.

BRIEF DESCRIPTION OF THE DRAWINGS

FIG. 3 shows a workflow for unsupervised training of a segmentation network for medical image segmentation, in accordance with one or more embodiments;

FIG. 4 shows exemplary pseudocode for implementing the steps of method 200 of FIG. 2 for training a segmentation network, in accordance with one or more embodiments;

FIG. 6 shows a method for medical image segmentation using a trained machine learning based segmentation network, in accordance with one or more embodiments;

FIG. 7 shows a table comparing results of a segmentation network trained in accordance with embodiments described herein with results of conventional approaches;

FIG. 9 shows a comparison between the number of confident examples with epochs, along with segmentation results in accordance with one or more embodiments;

DETAILED DESCRIPTION

Figure 1:
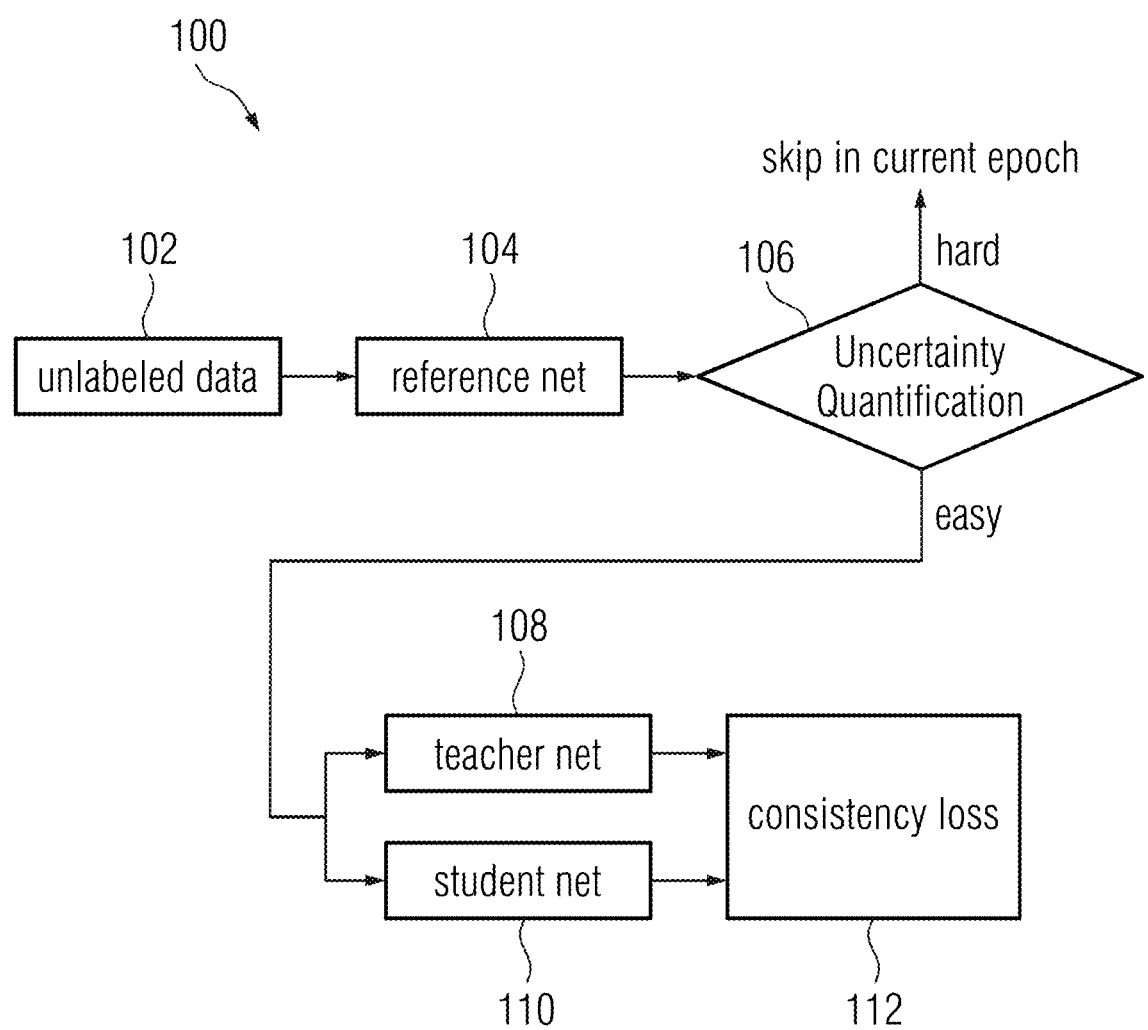
FIG. 1 shows a framework for training a machine learning based segmentation network for medical image segmentation using uncertainty-guided curriculum learning, in accordance with one or more embodiments.

The present invention generally relates to methods and systems for cross domain segmentation with uncertainty-guided curriculum learning. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Embodiments of the present invention will be described herein with reference to the drawings, where like reference numerals represent the same or similar elements.

Embodiments described herein provide for a cross domain framework for training a machine learning based segmentation network for medical image segmentation using uncertainty-guided curriculum learning. FIG. 1 shows a framework 100 for training a machine learning based segmentation network for medical image segmentation using uncertainty-guided curriculum learning, in accordance with one or more embodiments. Framework 100 comprises a two-stage approach for progressively training the segmentation network using a large-scale training dataset of unannotated (i.e., unlabeled) images.

During the first stage, an uncertainty associated with segmenting an anatomical object from each image of an unlabeled dataset 102 is determined. The anatomical objects are segmented from each image of unlabeled dataset 102 by reference network 104. Uncertainty 106 associated with the segmentation of the anatomical objects from each respective image of unlabeled data 102 is quantified and it is determined whether the respective image is considered an easy case (i.e., the respective image is suitable for training the segmentation network) or a hard case (i.e., the respective image is not suitable training the segmentation network) based on the uncertainty.

During the second stage, the segmentation network is trained using the images that are determined to be easy cases in an unsupervised approach. The segmentation network is trained as student network 110 using teacher network 108 with teacher-student curriculum learning according to consistency loss 112 such that teacher network 108 is applied to generate annotations for the training images.

The steps of framework 100 are iteratively repeated for training the segmentation network using the unlabeled dataset 102 for a plurality of epochs. After each epoch, the threshold for determining easy cases is progressively updated. In this manner, the segmentation network is progressively trained starting with easier cases and progressing to harder cases. Accordingly, while reference network 104 may generate segmentation results that are of relatively low quality, the segmentation results of reference network 104 may be utilized to quantify the uncertainty associated performing such segmentation to thereby progressively train student network 110 (i.e., the segmentation network). In some embodiments, student network 110 may additionally be trained with annotated training images in a semi-supervised approach. Advantageously, the segmentation network is trained in accordance with embodiments described herein with unsupervised and/or semi-supervised learning to provide accurate segmentation results, which may be scaled for very large training datasets.

Figure 2:
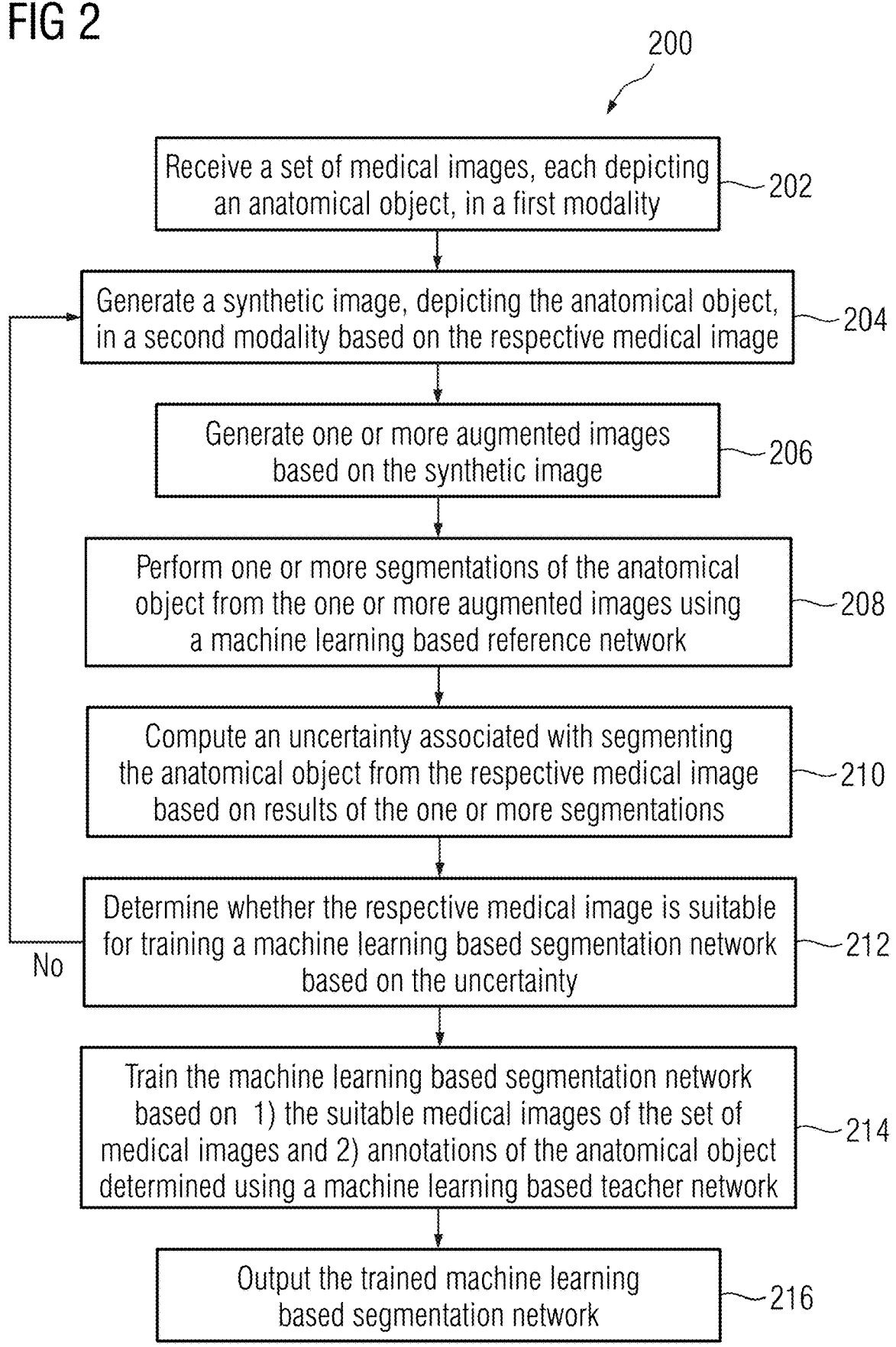
FIG. 2 shows a method for training a segmentation network for medical image segmentation, in accordance with one or more embodiments.

FIG. 2 shows a method 200 for training a segmentation network for medical image segmentation, in accordance with one or more embodiments. The steps of method 200 may be performed by one or more suitable computing devices, such as, e.g., computer 1202 of FIG. 12. FIG. 3 shows a workflow 300 for unsupervised training of a segmentation network for medical image segmentation, in accordance with one or more embodiments. FIG. 2 and FIG. 3 will be described together.

The steps and/or operations of method 200 of FIG. 2 and workflow 300 of FIG. 3 are performed during an offline training stage for training the segmentation network. Once trained, the trained segmentation network may be applied during an online or inference stage for performing medical image segmentation. For example, the trained segmentation network may be applied during an online or inference stage to perform step 604 of FIG. 6.

Workflow 300 of FIG. 3 comprises a pretrained reference network $S_s^{pretrain}$ 310, a teacher segmentation network $S_t^{tea}$ 320, and a student segmentation network $S_t^{stu}$ 322. The segmentation network is trained as student network $S_t^{stu}$ 322 for performing medical image segmentation. Teacher network $S_t^{tea}$ 320 and student network $S_t^{stu}$ 322 are initialized with pretrained reference network $S_s^{pretrain}$ 310.

At step 202 of FIG. 2, a set of medical images, each depicting an anatomical object, in a first modality is received. The set of medical images is denoted $\{x_t\} \in X_t$, where t denotes the target domain (i.e., the first modality). In one embodiment, the anatomical object is the heart of a patient. However, the anatomical object may be any organ, bone, lesion, or any other anatomical object of interest of the patient. In one embodiment, the medical images of the set of medical images are not annotated (i.e., not labelled) to identify the anatomical object.

In one embodiment, the medical images of the set of medical images in the first modality are x-ray medical images. For example, as shown in FIG. 3, a respective medical image of the set of medical images may be x-ray medical image 302. However, the first modality may be any other suitable modality, such as, e.g., CT (computed tomography), MRI (magnetic resonance imaging), ultrasound, or any other medical imaging modality or combinations of medical imaging modalities. The set of medical images may comprise 2D (two dimensional) images and/or 3D (three dimensional) volumes, and may comprise a single medical image or a plurality of medical images. The set of medical images may be received directly from an image acquisition device, such as, e.g., an x-ray scanner, as the set of medical images is acquired, or can be received by loading previously acquired medical images from a storage or memory of a computer system or receiving medical images that have been transmitted from a remote computer system.

Steps 204-212 of method 200 are performed for each respective medical image of the set of medical images to identify the medical images of the set of medical images that are suitable for training the machine learning based segmentation network.

At step 204 of FIG. 2, a synthetic image, depicting the anatomical object, in a second modality is generated based on the respective medical image. The synthetic image is denoted $\{x_s, y_s\} \in (X_s, Y_s)$, where s denotes the source domain (i.e., the second modality) and $|X_t| \gg |X_s|$.

In one embodiment, the synthetic image in the second modality is a DRR (digitally reconstructed radiograph). However, the synthetic image in the second modality may be of any other suitable modality and may be generated using any suitable approach. For example, the second modality may be x-ray, CT, MRI, ultrasound, or any other medical imaging modality or combinations of medical imaging modalities. The synthetic image may comprise 2D images and/or 3D volumes, and may comprise a single medical image or a plurality of medical images. The first modality and the second modality may be the same modality or different modalities.

In one example, as shown in FIG. 3, the synthetic image is synthetic DRR 306 generated by machine learning based generator network $G_{t \to s}$ 304 from x-ray medical image 302. In one embodiment, generator network $G_{t \to s}$ 304 is part of a TD-GAN (task driven generative adversarial network), which is implemented with a CycleGAN base architecture for image synthesis. Advantageously, in this embodiment, the CycleGAN comprises a pretrained reference network $S_s^{pretrain}$ 310 to enforce segmentation consistency during the style transfer, which can be used to generate final segmentation results 314 and during step 206 of FIG. 2. Generator network $G_{t \to s}$ 304 receives as input x-ray medical image 302 and generates as output synthetic DRR 306.

At step 206 of FIG. 2, one or more augmented images are generated based on the synthetic image. As shown in FIG. 3, a set of transformations $\{\mathcal{T}_i\}_{i=1}^n$ 308 is applied to synthetic DRR 306 to generate the one or more augmented images. The set of transformations $\{\mathcal{T}_i\}_{i=1}^n$ 308 may comprise any operation, such as, for example, identity, horizontal flipping Gaussian blue, and various rotations with predefined angles.

At step 208 of FIG. 2, one or more segmentations of the anatomical object from the one or more augmented images are performed using a machine learning based reference network. In one example, as shown in FIG. 3, the reference network is pretrained reference network $S_s^{pretrain}$ 310. Reference network $S_s^{pretrain}$ 310 receives as input the one or more augmented images and generates as output initial segmentation results (e.g., a segmentation map) segmenting the anatomical object for each of the one or more augmented images. The transformations are then reversed on the initial segmentation results by applying a set of inverse transformations $\{\mathcal{T}_i^{-1}\}_{i=1}^n$ 312 to generate final segmentation results 314, which are shown as DRR SoftMax predictions in FIG. 3. Set of inverse transformations $\{\mathcal{T}_i^{-1}\}_{i=1}^n$ 312 are the inverse of set of transformations $\{\mathcal{T}_i\}_{i=1}^n$ 308.

At step 210 of FIG. 2, an uncertainty associated segmenting the anatomical object from the respective medical image is computed based on results of the one or more segmentations. In one example, as shown in FIG. 3, the uncertainty is computed at uncertainty quantification decision block 316 to compute the uncertainty associated with segmenting the anatomical object from x-ray medical image 302 based on final segmentation results 314.

In one embodiment, given the x-ray medial image $x_t$ 302 and the set of transformations $\mathcal{T}$ 308, the uncertainty $U(x_t)$ of segmenting the anatomical object from the x-ray medial image $x_t$ 302 is defined in Equation (1):

$$U(x_t) = \sup_{\mathcal{T}} D\left(\tilde{S}_s^{pretrain}(\mathcal{T}(G_{t \to s}(x_t))), E_{\mathcal{T}}\left[\tilde{S}_s^{pretrain}(\mathcal{T}(G_{t \to s}(x_t)))\right]\right). \quad (1)$$

$\tilde{S}_s^{pretrain}$ represents the composition of two functions $\mathcal{T}^{-1} \circ S_s^{pretrain}$, which reverses the set of transformations $\{\mathcal{T}_i\}_{i=1}^n$ 308 to map back the transformed input to the original view. D is a distance function quantifying the quality of the final segmentation results 314 under each transformation as compared to their average. A larger distance D implies a greater deviation and thus uncertainty in the predicted segmentation results of reference network $S_s^{pretrain}$ 310. In Equation (1), uncertainty $U(x_t)$ is defined as the maximum deviation. The x-ray medial image $x_t$ 302 is only considered to have sufficient certainty if reference network $S_s^{pretrain}$ 310 produces consistent predictions for the final segmentation results 314. In one embodiment, the distance function D is one minus the Dice coefficient. However, the distance function D can be any other suitable distance function.

At step 212 of FIG. 2, it is determined whether the respective medical image is suitable for training a machine learning based segmentation network based on the uncertainty. In one embodiment, it is determined whether the respective medical image is suitable for training a machine learning based segmentation network by comparing the uncertainty $U(x_t)$ with a predefined threshold $\tau_u$.

As shown in FIG. 3, in response to determining that the uncertainty $U(x_t)$ satisfies (e.g., is less than or equal to) the threshold $\tau_u$ at uncertainty quantification decision block 316, the x-ray medical image $x_t$ 302 is considered to be an easy case (i.e., have relatively low uncertainty) and thus the x-ray medical image $x_t$ 302 is suitable for training the segmentation network. The x-ray medical image $x_t$ 302 is then stored in memory bank 326 for training the segmentation network. In response to determining that the uncertainty $U(x_t)$ does not satisfy (e.g., is greater than) the threshold $\tau_u$ at uncertainty quantification decision block 316, the x-ray medical image $x_t$ 302 is considered to be a hard case (i.e., have relatively high uncertainty) and thus the x-ray medical image $x_t$ 302 is not suitable for training the segmentation network. The x-ray medical image $x_t$ 302 is skipped for training the segmentation network during the current epoch.

At step 214 of FIG. 2, the machine learning based segmentation network is trained based on 1) the suitable medical images of the set of medical images (determined at step 210) and 2) annotations of the anatomical object determined using a machine learning based teacher network. As shown in FIG. 3, the segmentation network is trained as student network $S_t^{stu}$ 322 with teacher-student consistency using teacher network $S_t^{tea}$ 320 according to consistency loss 324, where annotations for x-ray image 302 are generated by teacher network $S_t^{tea}$ 320.

Due to the domain gap, teacher network $S_t^{tea}$ 320 will be weak at the beginning and the pseudo-labels generated by teacher network $S_t^{tea}$ 320 will be imperfect. However, through the teacher-student self-ensemble training and source-aided sample selection, the performance of teacher network $S_t^{tea}$ 320 is progressively increased over the easy cases to generate better pseudo-labels and improve the performance of student network $S_t^{stu}$ 322. A positive learning loop is thus created. Generally, throughout the training, only student network $S_t^{stu}$ 322 is trainable. Updates of the weights of teacher network $S_t^{tea}$ 320 come from the exponential moving average of student network $S_t^{stu}$ 322, which is performed, e.g., after training the segmentation network with batches of predetermined size of images of the set of medical images. For example, the weights of teacher network $S_t^{tea}$ 320 may be updated after each epoch.

To effectively use x-ray medical image $x_t$ 302 for training, x-ray medical image $x_t$ 302 is retrieved from memory bank 326 and a set of transformations $\{\mathcal{T}_i\}_{i=1}^n$ 318 is applied to x-ray medical image $x_t$ 302. A teacher-student consistency loss is imposed on every augmented image. Thus, the total consistency loss is defined in Equation (2):

$$L(x_t) = \sum_{i=1}^{m} \tilde{D}(H(S_t^{tea}(\mathcal{T}_i(x_t))), S_t^{stu}(\mathcal{T}_i(x_t))) * I_{ts}(x_t) \quad (2)$$

$\tilde{D}$ is a combination of cross-entropy loss and soft dice loss. H represents a hard thresholding function that processes the SoftMax prediction into one-hot form. The set of transformations $\{\mathcal{T}_i\}_{i=1}^n$ 318 include both weak augmentations (i.e., the same transformations as set of transformations $\{\mathcal{T}_i\}_{i=1}^n$ 308) and strong augmentations (i.e., new transformations not in set of transformations $\{\mathcal{T}_i\}_{i=1}^n$ 308) generated via, e.g., a random augmentation function RandAugment.

Both student network $S_t^{stu}$ 322 and teacher network $S_t^{tea}$ 320 share the identical network structure as reference network $S_s^{pretrain}$ 310. As uncertainty quantification is done in the source domain (i.e., the second modality), in early phases of training, not all medical images determined to be suitable for training the segmentation network are actually easy for teacher network $S_t^{tea}$ 320. An additional gating is thus imposed as $I_{ts}$ in a warm-up phase. The indicator function $I_{ts}$ is defined by the disagreement between the source and target predictions as in Equation (3):

$$I_{ts} := I(D(S_t^{tea}(x_t), S_s^{pretrain}(G_{t \to s}(x_t))) \leq \tau_{ts}) \quad (3)$$

Threshold $\tau_{ts}$ is a bound value defined according to, for example, a linear scheduling starting at 0.3 and gradually increasing.

In addition to the exponential moving average, the weights of teacher network $S_t^{tea}$ 320 are also updated with regularization terms $\alpha$ and $\beta$ of the reference network to help stabilize the training. The weights $\theta_t^{tea,(i)}$ of teacher network $S_t^{tea}$ 320 at each training step i are updated as in Equation (4):

$$\theta_t^{tea,(i)} = (1-\alpha-\beta)\theta_t^{tea(i-1)} + \alpha\theta_t^{stu,(i)} + \beta\theta_s^{pretrain} \quad (4)$$

In one embodiment, regularization terms $\alpha$ and $\beta$ are both set to 0.001.

In one embodiment, steps 204-214 of FIG. 2 are iteratively repeated for a plurality of epoch using the set of medical images for training the segmentation network. The threshold $\tau_u$ for determining whether each respective medical image is suitable for training the segmentation network (at step 212) may be updated, e.g., after every epoch or any other suitable time period. In one embodiment, threshold $\tau_u$ may be defined according to a linear scheduling starting from 0.05 and progressively increasing at each epoch. In this manner, the segmentation network is progressively trained at step 214 with harder and harder cases.

At step 216 of FIG. 2, the trained machine learning based segmentation network is output. For example, the trained machine learning based segmentation network can be output by storing the trained machine learning based segmentation network on a memory or storage of a computer system or by transmitting the trained machine learning based segmentation network to a remote computer system.

FIG. 4 shows exemplary pseudocode 400 for implementing the steps of method 200 of FIG. 2 for training a segmentation network, in accordance with one or more embodiments.

In one embodiment, to improve training efficiency, a counter representing a frequency that a respective medical image has been determined as being suitable for training the machine learning based segmentation network (e.g., during prior epochs) is continuously updated at memory bank 326 of FIG. 3. A respective medical image associated with a counter that satisfies (e.g., greater than or equal to) a predefined threshold value (e.g., 5) is considered to have consistently certain segmentation results and thus is considered to be suitable for training the segmentation network. Accordingly, as shown in FIG. 3, a respective medical image that is not considered to have consistently certain segmentation results proceeds to generator network $G_{t \to s}$ 304 for generating synthetic DRR 306 (corresponding to step 204 of FIG. 2). A respective medical image that is considered to have consistently certain segmentation results may skip the uncertainty evaluation (corresponding to steps 204-210) and may instead proceed directly to set of transformations $\{\mathcal{T}_i\}_{i=1}^n$ 318 for training student network $S_t^{stu}$ 322 with teacher network $S_t^{tea}$ 320 (corresponding to step 212 of FIG. 2).

Figure 5:
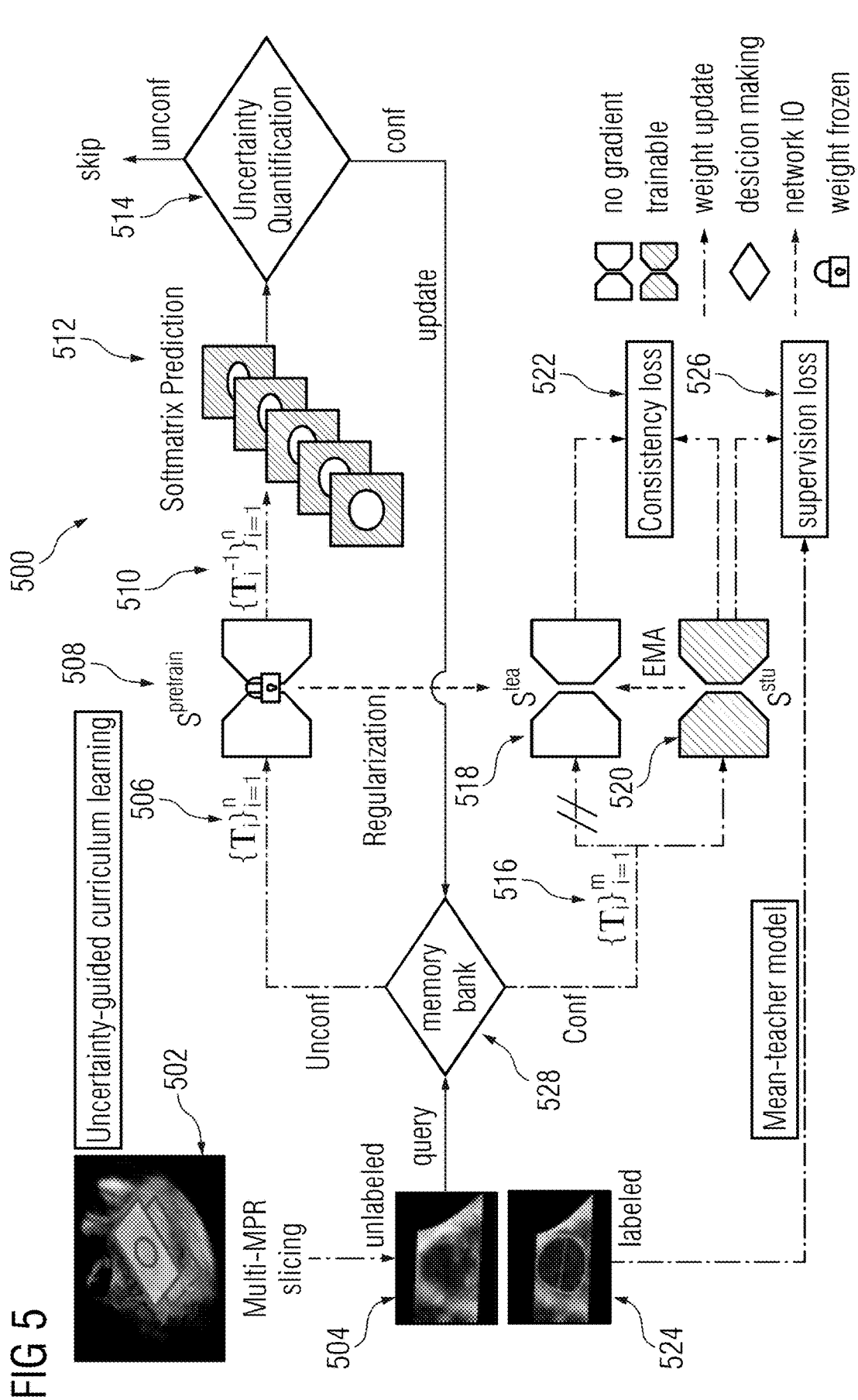
FIG. 5 shows a workflow for semi-supervised training of a segmentation network using unannotated and annotated images, in accordance with one or more embodiments.

In one embodiment, the segmentation network is additionally trained with annotated (i.e., labelled) images at step 214 of FIG. 2 under a semi-supervised approach. FIG. 5 shows a workflow 500 for semi-supervised training of a segmentation network using unannotated and annotated images, in accordance with one or more embodiments. In workflow 500, an unannotated (i.e., unlabeled) slice 504 of multi-MPR (multiplanar reformation) slicing image 502 is received. Memory bank 528 is queried to determine if slice 504 is considered to have consistently certain segmentation results. If it is determined that slice 504 is considered to not have consistently certain segmentation results, set of transformations $\{\mathcal{T}_i\}_{i=1}^n$ 506 are applied to generate augmented images and one or more initial segmentation results of the anatomical object from the augmented images are determined by pretrained segmentation network $S_s^{pretrain}$ 508. A set of inverse transformations $\{\mathcal{T}_i^{-1}\}_{i=1}^n$ 510 are applied to the one or more initial segmentation results to generate final segmentation results 512. At block 514, an uncertainty associated with segmenting the anatomical object from slice 504 is computed. If slice 504 is determined to be not suitable for training the segmentation network, slice 504 is skipped for training the segmentation network during the current epoch. If it is determined that slice 504 is considered to have consistently certain segmentation results (at memory bank 528S) or if slice 504 is otherwise determined to be suitable for training the segmentation network (at uncertainty quantification block 514), set of transformations $\{\mathcal{T}_i\}_{i=1}^n$ 516 are applied to slice 504 for training the segmentation network as student network $S_t^{stu}$ 520 using student-teacher curriculum learning with teacher network $S_t^{tea}$ 518 according to a consistency loss 522. In one embodiment, annotated (e.g., labeled) image 524 is also received and student network $S_t^{stu}$ 520 is trained based on annotated image 524 according to supervision loss 526.

FIG. 6 shows a method 600 for medical image segmentation using a trained machine learning based segmentation network, in accordance with one or more embodiments. The steps of method 600 may be performed by one or more suitable computing devices, such as, e.g., computer 1202 of FIG. 12. The steps of method 600 are performed for medical image segmentation using a trained segmentation network during an online or inference stage. The trained segmentation network is trained to perform medical image segmentation during a prior offline training stage.

At step 602 of FIG. 6, an input medical image depicting an anatomical object is received. The anatomical object may be a heart of a patient, or any organ, bone, lesion, or any other anatomical object of interest of the patient. In one embodiment, the input medical image is an x-ray medical image. However, the x-ray medical image may be of any other suitable modality, such as, e.g., CT, MRI, ultrasound, or any other medical imaging modality or combinations of medical imaging modalities. The input medical image may comprise 2D (two dimensional) images and/or 3D (three dimensional) volumes, and may comprise a single medical image or a plurality of medical images. The input medical image may be received directly from an image acquisition device, such as, e.g., an x-ray scanner, as the input medical image is acquired, or can be received by loading previously acquired medical images from a storage or memory of a computer system or receiving medical images that have been transmitted from a remote computer system.

At step 604 of FIG. 6, a segmentation of the anatomical object from the input medical image is performed using a trained machine learning based segmentation network. The trained segmentation network may be trained using any suitable approach during a prior offline training stage. In one embodiment, the trained segmentation network may be trained in accordance with one or more embodiments described herein, such as, e.g., method 200 of FIG. 2, workflow 300 of FIG. 3, and workflow 500 of FIG. 5.

At step 606 of FIG. 6, results of the segmentation are output. For example, the results of the segmentation can be output by displaying the results of the segmentation on a display device of a computer system, storing the results of the segmentation on a memory or storage of a computer system, or by transmitting the results of the segmentation to a remote computer system.

Embodiments described herein were experimentally validated. The focus of the experiments was on cross domain heart segmentation and embodiments described herein were validated both quantitatively and qualitatively.

Model training: In the source domain (i.e., the second modality), 230 labeled DRRs were utilized, which were generated from the same number of 3D CT scans. Each CT volume is from a different patient. In the target domain (i.e., the first modality), the NLM (national library of medicine) dataset was used. The NLM dataset comprised 7,470 unlabeled chest X-ray images collected from 3,955 patients. This dataset comprises X-rays of both PA (posteroanterior) and lateral views. The lateral-viewed images were not filtered but were kept to challenge the proposed approach in accordance with embodiments described herein, since in practice it is possible that application domain contains out-of-distribution data.

Model validation and testing: Since the NLM dataset does not provide annotations, segmentation network trained in accordance with embodiments described herein was evaluated on the JSRT (Japanese Society of Radiological Technology) dataset. The JSRT dataset comprises 247 PA-viewed chest X-rays with heart annotations. Eight images were randomly selected for validation and the best validated model were used to test over the rest 239 images.

Figure 8:
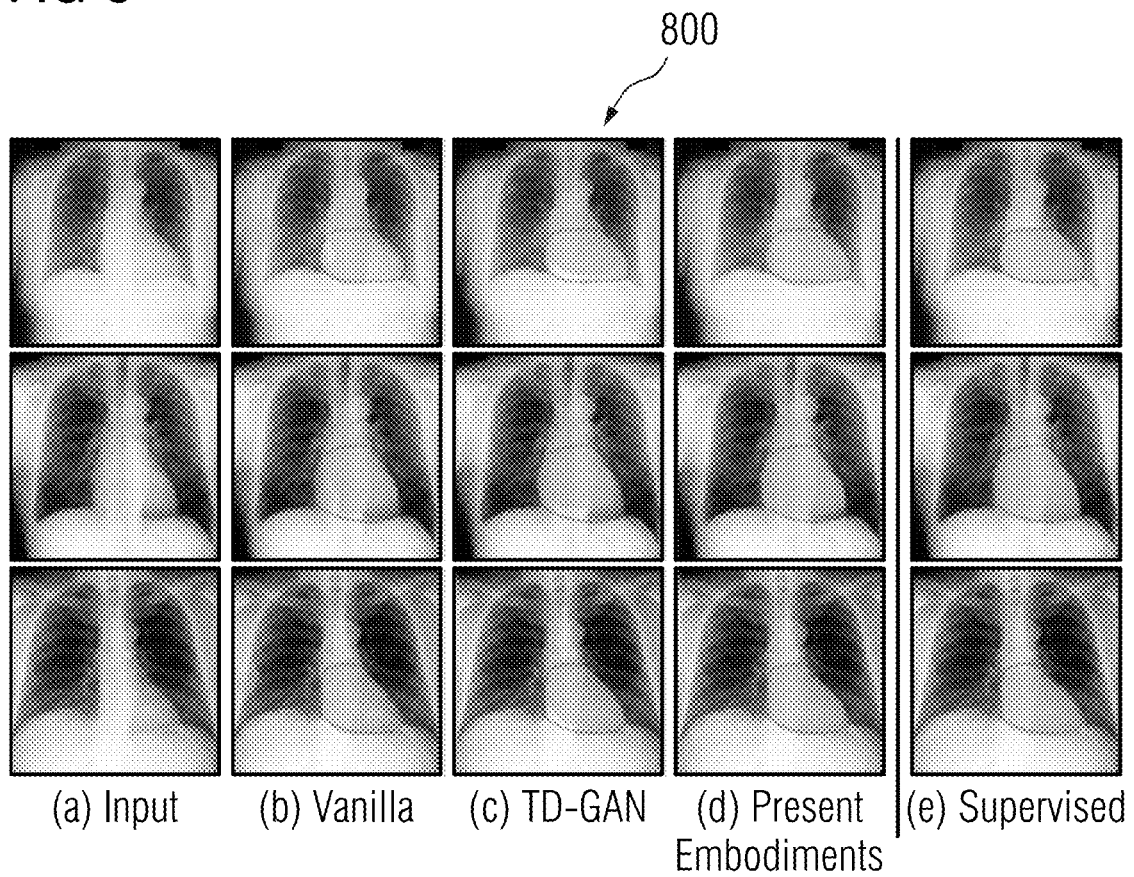
FIG. 8 shows images visualizing heart segmentation results according to the embodiments described herein as compared to conventional approaches.

Implementation: All images were resized to 256×256. For the curriculum learning stage, a batch size of 64 was used with an AdamW optimizer with a learning rate 0.001. All models were implemented with MONAI (medical open network for artificial intelligence) and trained on NVIDIA Tesla V100 GPU with 32 GB RAM. The segmentation network trained in accordance with embodiments described herein were compared with various conventional approaches: 1) Vanilla: directly apply reference network $S_s^{pretrain}$ in the target domain; 2) TD-GAN: domain adaptation on balanced data without curriculum learning stage; and 3) Supervised: a two-fold equal train-test splitting was applied and the results averaged. Though testing size differs from other methods, it was mainly used for upper-bound estimation. FIG. 7 shows a table 700 comparing results of a segmentation network trained in accordance with embodiments described herein with results of conventional approaches. As shown in table 700, the results of the present embodiments outperform both vanilla and TD-GAN approaches by a large margin and achieves close performance with the supervised approach. This demonstrates that proper curriculum together with consistency learning in large scale data can effectively increase the performance of a weakly performed network even though the data is unlabeled. FIG. 8 shows images 800 visualizing heart segmentation results from the JSRT dataset according to the embodiments described herein as compared to conventional approaches. Column (a) shows the input medical images, column (b) shows segmentation results of the conventional vanilla approach, column (c) shows segmentation results of the conventional TD-GAN approach, column (d) shows segmentation results in accordance with embodiments described herein, and column (e) shows segmentation results of a conventional supervised learning approach. Selected results were further visualized at various percentiles of all testing dice scores (row-1 25% 0.90, row-2 50% 0.93, row-3 80% 0.96) in FIG. 8.

To better understand the curriculum, analysis was performed on the confident samples in the memory bank. FIG. 9 shows a comparison between the number of confident examples with epochs, along with segmentation results in accordance with one or more embodiments. Image 900 shows that the total number of confident samples are steadily increasing at each epoch. This nearly strictly monotonic curve also implies that the teacher-student model is continuously challenged by new and slightly harder samples at each epoch. This is an important feature of large data curriculum learning, i.e., there always exist a subset of samples that match a given (proper) window of model difficulty. Image 910 visualizes confident samples at selected epochs. Each of the images shows the first epoch index that these samples are considered confident. It can be seen that with increasing epochs, the network start getting confidence on images with extended views (ep23 and ep33) and slightly different contrast (ep28).

Advantageously, embodiments described herein mitigate the effort required for labelling medical images for training segmentation networks. It was demonstrated that segmentation networks trained in accordance with embodiments described herein achieve similar performance as segmentation networks trained with supervised learning.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 10:
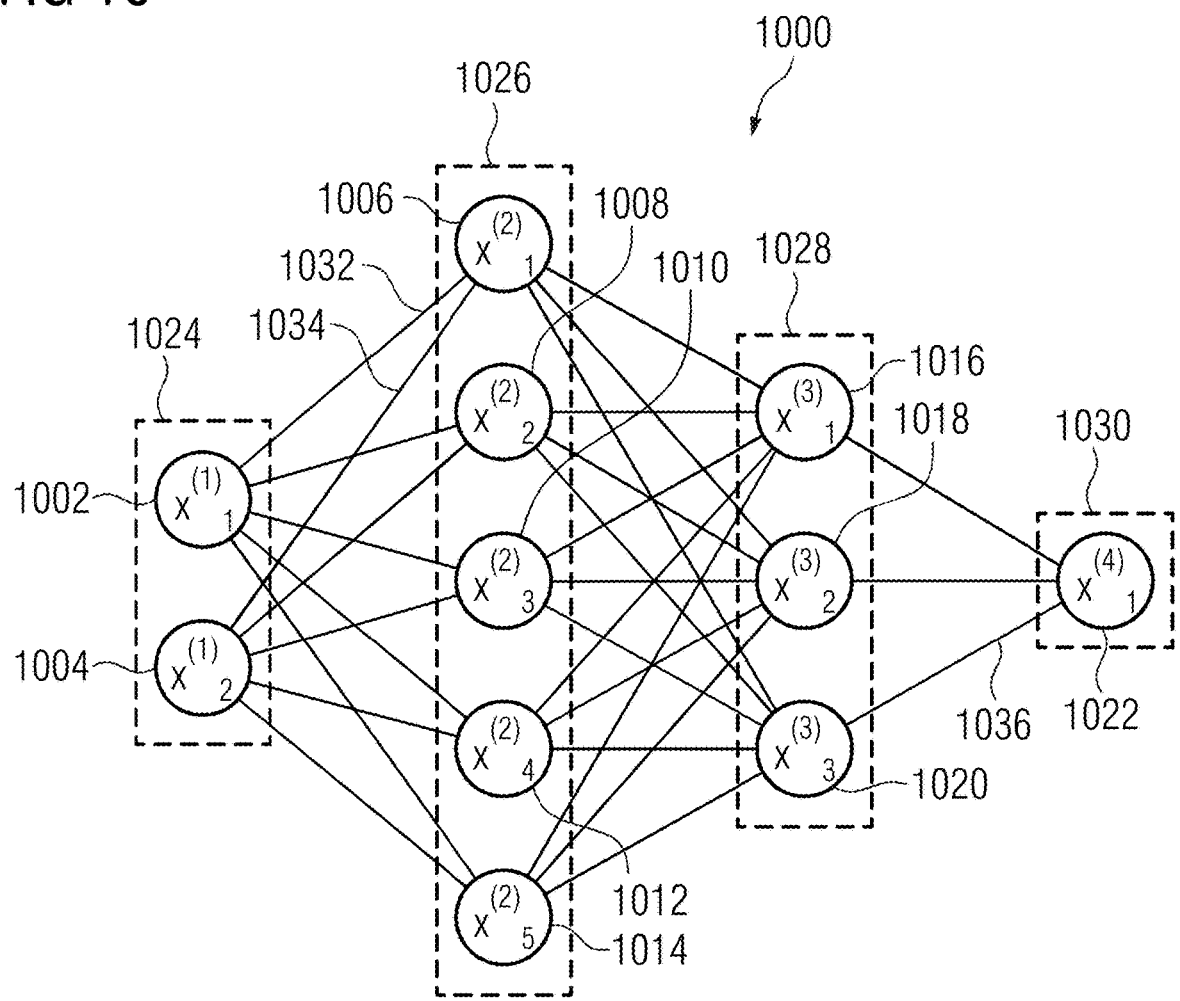
FIG. 10 shows an exemplary artificial neural network that may be used to implement one or more embodiments.

FIG. 10 shows an embodiment of an artificial neural network 1000, in accordance with one or more embodiments. Alternative terms for "artificial neural network" are "neural network", "artificial neural net" or "neural net". Machine learning networks described herein, such as, e.g., reference network 104, teacher network 108, and student network 110 of FIG. 1, the networks utilized at steps 204, 206, and 212 of FIG. 2, generator network $G_{t \to s}$ 304, pretrained reference network $S_s^{pretrain}$ 310, teacher network $S_t^{tea}$ 320, and student network $S_t^{stu}$ 322 of FIG. 3, and pretrained segmentation network $S_s^{pretrain}$ 508, teacher network $S_t^{tea}$ 518, and student network $S_t^{stu}$ 520 of FIG. 5, may be implemented using artificial neural network 1000.

The artificial neural network 1000 comprises nodes 1002-1022 and edges 1032, 1034, ..., 1036, wherein each edge 1032, 1034, ..., 1036 is a directed connection from a first node 1002-1022 to a second node 1002-1022. In general, the first node 1002-1022 and the second node 1002-1022 are different nodes 1002-1022, it is also possible that the first node 1002-1022 and the second node 1002-1022 are identical. For example, in FIG. 10, the edge 1032 is a directed connection from the node 1002 to the node 1006, and the edge 1034 is a directed connection from the node 1004 to the node 1006. An edge 1032, 1034, ..., 1036 from a first node 1002-1022 to a second node 1002-1022 is also denoted as "ingoing edge" for the second node 1002-1022 and as "outgoing edge" for the first node 1002-1022.

In this embodiment, the nodes 1002-1022 of the artificial neural network 1000 can be arranged in layers 1024-1030, wherein the layers can comprise an intrinsic order introduced by the edges 1032, 1034, ..., 1036 between the nodes 1002-1022. In particular, edges 1032, 1034, ..., 1036 can exist only between neighboring layers of nodes. In the embodiment shown in FIG. 10, there is an input layer 1024 comprising only nodes 1002 and 1004 without an incoming edge, an output layer 1030 comprising only node 1022 without outgoing edges, and hidden layers 1026, 1028 in-between the input layer 1024 and the output layer 1030. In general, the number of hidden layers 1026, 1028 can be chosen arbitrarily. The number of nodes 1002 and 1004 within the input layer 1024 usually relates to the number of input values of the neural network 1000, and the number of nodes 1022 within the output layer 1030 usually relates to the number of output values of the neural network 1000.

In particular, a (real) number can be assigned as a value to every node 1002-1022 of the neural network 1000. Here, $x^{(n)}_i$ denotes the value of the i-th node 1002-1022 of the n-th layer 1024-1030. The values of the nodes 1002-1022 of the input layer 1024 are equivalent to the input values of the neural network 1000, the value of the node 1022 of the output layer 1030 is equivalent to the output value of the neural network 1000. Furthermore, each edge 1032, 1034, ..., 1036 can comprise a weight being a real number, in particular, the weight is a real number within the interval [−1, 1] or within the interval [0, 1]. Here, $w^{(m,n)}_{i,j}$ denotes the weight of the edge between the i-th node 1002-1022 of the m-th layer 1024-1030 and the j-th node 1002-1022 of the n-th layer 1024-1030. Furthermore, the abbreviation $w^{(n)}_{i,j}$ is defined for the weight $w^{(n,n+1)}_{i,j}$.

In particular, to calculate the output values of the neural network 1000, the input values are propagated through the neural network. In particular, the values of the nodes 1002-1022 of the (n+1)-th layer 1024-1030 can be calculated based on the values of the nodes 1002-1022 of the n-th layer 1024-1030 by $$x_j^{(n+1)} = f\left(\sum_i x_i^{(n)} \cdot w_{i,j}^{(n)}\right).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 1024 are given by the input of the neural network 1000, wherein values of the first hidden layer 1026 can be calculated based on the values of the input layer 1024 of the neural network, wherein values of the second hidden layer 1028 can be calculated based in the values of the first hidden layer 1026, etc.

In order to set the values $w^{(m,n)}_{i,j}$ for the edges, the neural network 1000 has to be trained using training data. In particular, training data comprises training input data and training output data (denoted as $t_i$). For a training step, the neural network 1000 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 1000 (backpropagation algorithm). In particular, the weights are changed according to $$w'^{(n)}_{i,j} = w^{(n)}_{i,j} - \gamma \cdot \delta^{(n)}_j \cdot x^{(n)}_i$$

wherein $\gamma$ is a learning rate, and the numbers $\delta^{(n)}_j$ can be recursively calculated as $$\delta^{(n)}_j = (\Sigma_k \delta^{(n+1)}_k \cdot w^{(n+1)}_{j,k}) \cdot f'(\Sigma_i x^{(n)}_i \cdot w^{(n)}_{i,j})$$

$$\delta^{(n)}_j = (\Sigma_k \delta^{(n+1)}_k \cdot w^{(n+1)}_{j,k}) \cdot f'(\Sigma_i x^{(n)}_i \cdot w^{(n)}_{i,j})$$

based on $\delta^{(n+1)}_j$, if the (n+1)-th layer is not the output layer, and $$\delta^{(n)}_j = (x^{(n+1)}_k - t^{(n+1)}_j) \cdot f'(\Sigma_i x^{(n)}_i \cdot w^{(n)}_{i,j})$$

$$\delta^{(n)}_j = (x^{(n+1)}_k - t^{(n+1)}_j) \cdot f'(\Sigma_i x^{(n)}_i \cdot w^{(n)}_{i,j})$$

if the (n+1)-th layer is the output layer 1030, wherein f' is the first derivative of the activation function, and $y^{(n+1)}_j$ is the comparison training value for the j-th node of the output layer 1030.

Figure 11:
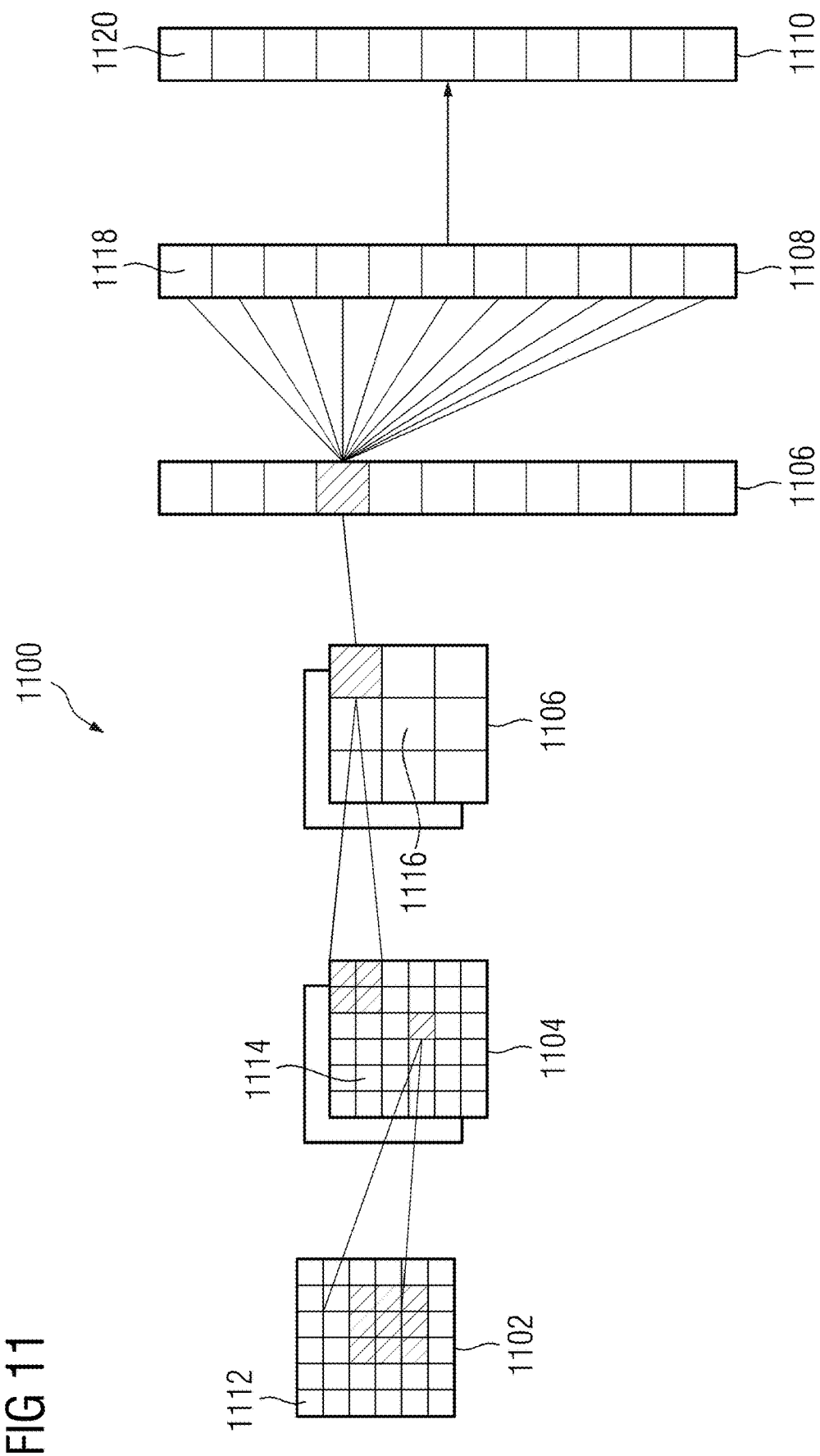
FIG. 11 shows a convolutional neural network that may be used to implement one or more embodiments.

FIG. 11 shows a convolutional neural network 1100, in accordance with one or more embodiments. Machine learning networks described herein, such as, e.g., reference network 114, teacher network 118, and student network 110 of FIG. 1, the networks utilized at steps 204, 206, and 212 of FIG. 2, generator network $G_{t \to s}$ 304, pretrained reference network $S_s^{pretrain}$ 310, teacher network $S_t^{tea}$ 320, and student network $S_t^{stu}$ 322 of FIG. 3, and pretrained segmentation network $S_s^{pretrain}$ 508, teacher network $S_t^{tea}$ 518, and student network $S_t^{stu}$ 520 of FIG. 5, may be implemented using convolutional neural network 1100.

In the embodiment shown in FIG. 11, the convolutional neural network comprises 1100 an input layer 1102, a convolutional layer 1104, a pooling layer 1106, a fully connected layer 1108, and an output layer 1110. Alternatively, the convolutional neural network 1100 can comprise several convolutional layers 1104, several pooling layers 1106, and several fully connected layers 1108, as well as other types of layers. The order of the layers can be chosen arbitrarily, usually fully connected layers 1108 are used as the last layers before the output layer 1110.

In particular, within a convolutional neural network 1100, the nodes 1112-1120 of one layer 1102-1110 can be considered to be arranged as a d-dimensional matrix or as a d-dimensional image. In particular, in the two-dimensional case the value of the node 1112-1120 indexed with i and j in the n-th layer 1102-1110 can be denoted as $x^{(n)}_{[i,j]}$. However, the arrangement of the nodes 1112-1120 of one layer 1102-1110 does not have an effect on the calculations executed within the convolutional neural network 1100 as such, since these are given solely by the structure and the weights of the edges.

In particular, a convolutional layer 1104 is characterized by the structure and the weights of the incoming edges forming a convolution operation based on a certain number of kernels. In particular, the structure and the weights of the incoming edges are chosen such that the values $x^{(n)}_k$ of the nodes 1114 of the convolutional layer 1104 are calculated as a convolution $x^{(n)}_k = K_k * x^{(n-1)}$ based on the values $x^{(n-1)}$ of the nodes 1112 of the preceding layer 1102, where the convolution * is defined in the two-dimensional case as $$x^{(n)}_k[i,j] = (K_k * x^{(n-1)})[i,j] = \Sigma_{i'} \Sigma_{j'} K_k[i',j'] \cdot x^{(n-1)}[i-i',j-j'].$$

Here the k-th kernel $K_k$ is a d-dimensional matrix (in this embodiment a two-dimensional matrix), which is usually small compared to the number of nodes 1112-1118 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 1112-1120 in the respective layer 1102-1110. In particular, for a convolutional layer 1104, the number of nodes 1114 in the convolutional layer is equivalent to the number of nodes 1112 in the preceding layer 1102 multiplied with the number of kernels.

If the nodes 1112 of the preceding layer 1102 are arranged as a d-dimensional matrix, using a plurality of kernels can be interpreted as adding a further dimension (denoted as "depth" dimension), so that the nodes 1114 of the convolutional layer 1104 are arranged as a (d+1)-dimensional matrix. If the nodes 1112 of the preceding layer 1102 are already arranged as a (d+1)-dimensional matrix comprising a depth dimension, using a plurality of kernels can be interpreted as expanding along the depth dimension, so that the nodes 1114 of the convolutional layer 1104 are arranged also as a (d+1)-dimensional matrix, wherein the size of the (d+1)-dimensional matrix with respect to the depth dimension is by a factor of the number of kernels larger than in the preceding layer 1102.

The advantage of using convolutional layers 1104 is that spatially local correlation of the input data can exploited by enforcing a local connectivity pattern between nodes of adjacent layers, in particular by each node being connected to only a small region of the nodes of the preceding layer.

In embodiment shown in FIG. 11, the input layer 1102 comprises 36 nodes 1112, arranged as a two-dimensional 6×6 matrix. The convolutional layer 1104 comprises 72 nodes 1114, arranged as two two-dimensional 6×6 matrices, each of the two matrices being the result of a convolution of the values of the input layer with a kernel. Equivalently, the nodes 1114 of the convolutional layer 1104 can be interpreted as arranges as a three-dimensional 6×6×2 matrix, wherein the last dimension is the depth dimension.

A pooling layer 1106 can be characterized by the structure and the weights of the incoming edges and the activation function of its nodes 1116 forming a pooling operation based on a non-linear pooling function f. For example, in the two dimensional case the values $x^{(n)}$ of the nodes 1116 of the pooling layer 1106 can be calculated based on the values $x^{(n-1)}$ of the nodes 1114 of the preceding layer 1104 as $$x^{(n)}[i,j] = f(x^{(n-1)}[id_1, jd_2], \ldots, x^{(n-1)}[id_1 + d_1 - 1, jd_2 + d_2 - 1])$$

In other words, by using a pooling layer 1106, the number of nodes 1114, 1116 can be reduced, by replacing a number d1·d2 of neighboring nodes 1114 in the preceding layer 1104 with a single node 1116 being calculated as a function of the values of said number of neighboring nodes in the pooling layer. In particular, the pooling function f can be the max-function, the average or the L2-Norm. In particular, for a pooling layer 1106 the weights of the incoming edges are fixed and are not modified by training.

The advantage of using a pooling layer 1106 is that the number of nodes 1114, 1116 and the number of parameters is reduced. This leads to the amount of computation in the network being reduced and to a control of overfitting.

In the embodiment shown in FIG. 11, the pooling layer 1106 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 1108 can be characterized by the fact that a majority, in particular, all edges between nodes 1116 of the previous layer 1106 and the nodes 1118 of the fully-connected layer 1108 are present, and wherein the weight of each of the edges can be adjusted individually.

In this embodiment, the nodes 1116 of the preceding layer 1106 of the fully-connected layer 1108 are displayed both as two-dimensional matrices, and additionally as non-related nodes (indicated as a line of nodes, wherein the number of nodes was reduced for a better presentability). In this embodiment, the number of nodes 1118 in the fully connected layer 1108 is equal to the number of nodes 1116 in the preceding layer 1106. Alternatively, the number of nodes 1116, 1118 can differ.

Furthermore, in this embodiment, the values of the nodes 1120 of the output layer 1110 are determined by applying the Softmax function onto the values of the nodes 1118 of the preceding layer 1108. By applying the Softmax function, the sum the values of all nodes 1120 of the output layer 1110 is 1, and all values of all nodes 1120 of the output layer are real numbers between 0 and 1.

A convolutional neural network 1100 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 1100 can be trained based on the backpropagation algorithm. For preventing overfitting, methods of regularization can be used, e.g. dropout of nodes 1112-1120, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 2 and 6. Certain steps or functions of the methods and workflows described herein, including one or more of the steps or functions of FIGS. 2 and 6, may be performed by a server or by another processor in a network-based cloud-computing system. Certain steps or functions of the methods and workflows described herein, including one or more of the steps of FIGS. 2 and 6, may be performed by a client computer in a network-based cloud computing system. The steps or functions of the methods and workflows described herein, including one or more of the steps of FIGS. 2 and 6, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 2 and 6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 12:
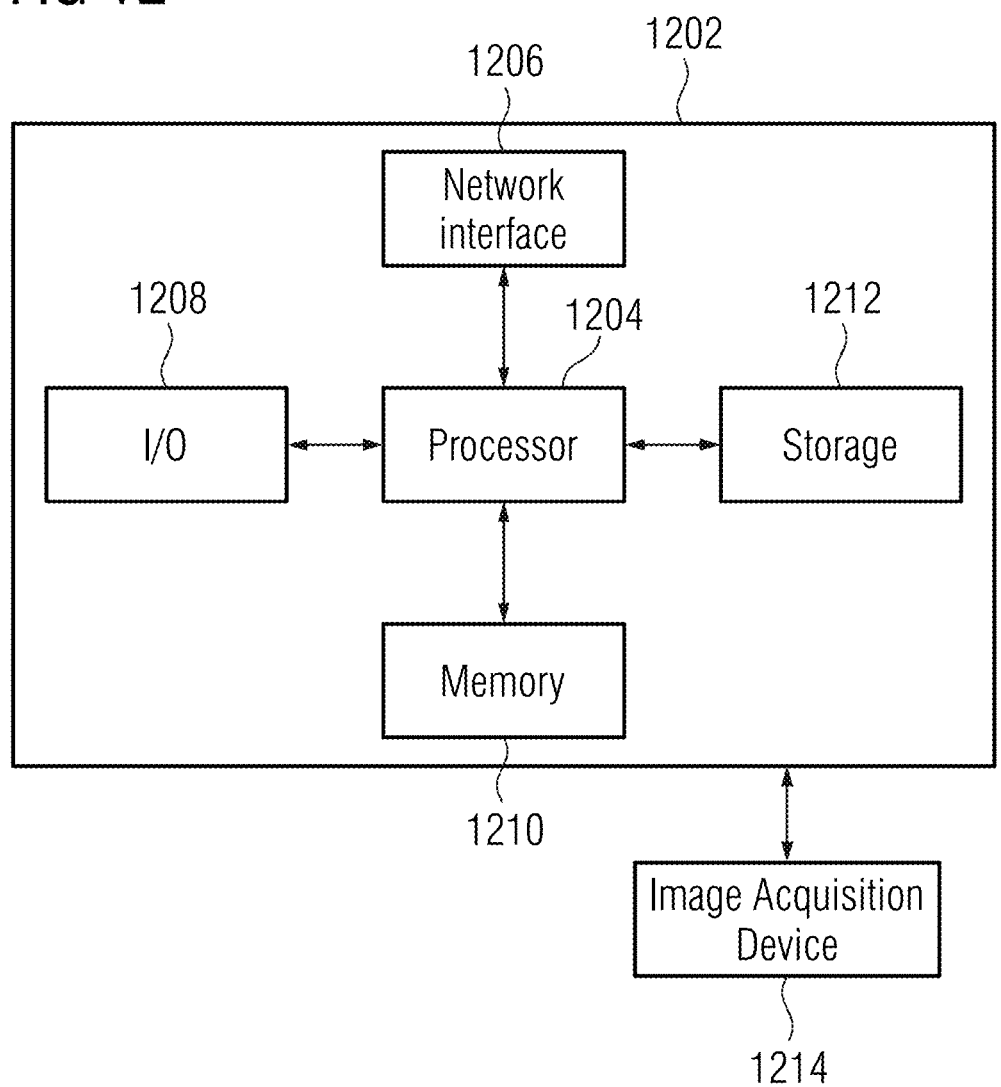
FIG. 12 shows a high-level block diagram of a computer that may be used to implement one or more embodiments.

A high-level block diagram of an example computer 1202 that may be used to implement systems, apparatus, and methods described herein is depicted in FIG. 12. Computer 1202 includes a processor 1204 operatively coupled to a data storage device 1212 and a memory 1210. Processor 1204 controls the overall operation of computer 1202 by executing computer program instructions that define such operations. The computer program instructions may be stored in data storage device 1212, or other computer readable medium, and loaded into memory 1210 when execution of the computer program instructions is desired. Thus, the method and workflow steps or functions of FIGS. 2 and 6 can be defined by the computer program instructions stored in memory 1210 and/or data storage device 1212 and controlled by processor 1204 executing the computer program instructions. For example, the computer program instructions can be implemented as computer executable code programmed by one skilled in the art to perform the method and workflow steps or functions of FIGS. 2 and 6. Accordingly, by executing the computer program instructions, the processor 1204 executes the method and workflow steps or functions of FIGS. 2 and 6. Computer 1202 may also include one or more network interfaces 1206 for communicating with other devices via a network. Computer 1202 may also include one or more input/output devices 1208 that enable user interaction with computer 1202 (e.g., display, keyboard, mouse, speakers, buttons, etc.).

Processor 1204 may include both general and special purpose microprocessors, and may be the sole processor or one of multiple processors of computer 1202. Processor 1204 may include one or more central processing units (CPUs), for example. Processor 1204, data storage device 1212, and/or memory 1210 may include, be supplemented by, or incorporated in, one or more application-specific integrated circuits (ASICs) and/or one or more field programmable gate arrays (FPGAs).

Data storage device 1212 and memory 1210 each include a tangible non-transitory computer readable storage medium. Data storage device 1212, and memory 1210, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1208 may include peripherals, such as a printer, scanner, display screen, etc. For example, input/output devices 1208 may include a display device such as a cathode ray tube (CRT) or liquid crystal display (LCD) monitor for displaying information to the user, a keyboard, and a pointing device such as a mouse or a trackball by which the user can provide input to computer 1202.

An image acquisition device 1214 can be connected to the computer 1202 to input image data (e.g., medical images) to the computer 1202. It is possible to implement the image acquisition device 1214 and the computer 1202 as one device. It is also possible that the image acquisition device 1214 and the computer 1202 communicate wirelessly through a network. In a possible embodiment, the computer 1202 can be located remotely with respect to the image acquisition device 1214.

Any or all of the systems and apparatus discussed herein may be implemented using one or more computers such as computer 1202.

One skilled in the art will recognize that an implementation of an actual computer or computer system may have other structures and may contain other components as well, and that FIG. 12 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
receiving a set of medical images, each depicting an anatomical object, in a first modality;
for each respective medical image of the set of medical images:
generating a synthetic image, depicting the anatomical object, in a second modality based on the respective medical image;
generating one or more augmented images based on the synthetic image;
performing one or more segmentations of the anatomical object from the one or more augmented images using a machine learning based reference network;
computing an uncertainty associated with segmenting the anatomical object from the respective medical image by:
quantifying a quality of each of the one or more segmentations of the anatomical object from the one or more augmented images,
calculating an average quality based on the quality of each of the one or more segmentations; and
computing the uncertainty based on a distance between the quality of each of the one or more segmentations and the average quality; and
determining whether the respective medical image is suitable for training a machine learning based segmentation network based on the uncertainty; and
training the machine learning based segmentation network based on 1) the suitable medical images of the set of medical images and 2) annotations of the anatomical object determined using a machine learning based teacher network.

2. The method of claim 1, wherein determining whether the respective medical image is suitable for training a machine learning based segmentation network based on the uncertainty comprises:
comparing the uncertainty with a threshold.

3. The method of claim 2, further comprising:
repeating the generating, the performing, the computing, the determining, and the training for a plurality of epochs.

4. The method of claim 3, wherein the threshold is updated after each of the plurality of epochs.

5. The method of claim 3, further comprising:
in response to determining that the respective medical image is suitable for training the machine learning based segmentation network, updating a counter representing a frequency that the respective medical image has been determined as being suitable for training the machine learning based segmentation network.

6. The method of claim 5, further comprising, during a next epoch:
   determining whether the respective medical image is suitable for training the machine learning based segmentation network based on the counter; and
   training the machine learning based segmentation network based on the respective medical image determined to be suitable for training the machine learning based segmentation network based on the counter.

7. The method of claim 1, wherein generating one or more augmented images based on the synthetic image comprises:
   applying one or more transformations to the synthetic image to generate the one or more augmented images.

8. The method of claim 1, wherein computing the uncertainty based on a distance between the quality of each of the one or more segmentations and the average quality comprises:
   computing a maximum deviation of the distance between the quality of each of the one or more segmentations and the average quality.

9. The method of claim 1, wherein training the machine learning based segmentation network based on 1) the suitable medical images of the set of medical images and 2) annotations of the anatomical object determined using a machine learning based teacher network comprises:
   training the machine learning based segmentation network based on one or more additional annotated medical images.

10. An apparatus comprising:
   means for receiving a set of medical images, each depicting an anatomical object, in a first modality;
   for each respective medical image of the set of medical images:
      means for generating a synthetic image, depicting the anatomical object, in a second modality based on the respective medical image;
      means for generating one or more augmented images based on the synthetic image;
      means for performing one or more segmentations of the anatomical object from the one or more augmented images using a machine learning based reference network;
      means for computing an uncertainty associated with segmenting the anatomical object from the respective medical image by:
         quantifying a quality of each of the one or more segmentations of the anatomical object from the one or more augmented images,
         calculating an average quality based on the quality of each of the one or more segmentations; and
         computing the uncertainty based on a distance between the quality of each of the one or more segmentations and the average quality; and
      means for determining whether the respective medical image is suitable for training a machine learning based segmentation network based on the uncertainty; and
   means for training the machine learning based segmentation network based on 1) the suitable medical images of the set of medical images and 2) annotations of the anatomical object determined using a machine learning based teacher network.

11. The apparatus of claim 10, wherein the means for determining whether the respective medical image is suitable for training a machine learning based segmentation network based on the uncertainty comprises:
   means for comparing the uncertainty with a threshold.

12. The apparatus of claim 11, further comprising:
   means for repeating the generating, the performing, the computing, the determining, and the training for a plurality of epochs.

13. The apparatus of claim 12, wherein the threshold is updated after each of the plurality of epochs.

14. The apparatus of claim 12, further comprising:
   in response to determining that the respective medical image is suitable for training the machine learning based segmentation network, means for updating a counter representing a frequency that the respective medical image has been determined as being suitable for training the machine learning based segmentation network.

15. The apparatus of claim 14, further comprising, during a next epoch:
   means for determining whether the respective medical image is suitable for training the machine learning based segmentation network based on the counter; and
   means for training the machine learning based segmentation network based on the respective medical image determined to be suitable for training the machine learning based segmentation network based on the counter.

16. A non-transitory computer readable medium storing computer program instructions, the computer program instructions when executed by a processor cause the processor to perform operations comprising:
   receiving a set of medical images, each depicting an anatomical object, in a first modality;
   for each respective medical image of the set of medical images:
      generating a synthetic image, depicting the anatomical object, in a second modality based on the respective medical image;
      generating one or more augmented images based on the synthetic image;
      performing one or more segmentations of the anatomical object from the one or more augmented images using a machine learning based reference network;
      computing an uncertainty associated with segmenting the anatomical object from the respective medical image by:
         quantifying a quality of each of the one or more segmentations of the anatomical object from the one or more augmented images,
         calculating an average quality based on the quality of each of the one or more segmentations; and
         computing the uncertainty based on a distance between the quality of each of the one or more segmentations and the average quality; and
      determining whether the respective medical image is suitable for training a machine learning based segmentation network based on the uncertainty; and
   training the machine learning based segmentation network based on 1) the suitable medical images of the set of medical images and 2) annotations of the anatomical object determined using a machine learning based teacher network.

17. The non-transitory computer readable medium of claim 16, wherein generating one or more augmented images based on the synthetic image comprises:
   applying one or more transformations to the synthetic image to generate the one or more augmented images.

18. The non-transitory computer readable medium of claim 16, wherein computing the uncertainty based on a distance between the quality of each of the one or more segmentations and the average quality comprises:
  computing a maximum deviation of the distance between the quality of each of the one or more segmentations and the average quality.

19. The non-transitory computer readable medium of claim 16, wherein training the machine learning based segmentation network based on 1) the suitable medical images of the set of medical images and 2) annotations of the anatomical object determined using a machine learning based teacher network comprises:
  training the machine learning based segmentation network based on one or more additional annotated medical images.

20. A method comprising:
  receiving an input medical image depicting an anatomical object;
  performing a segmentation of the anatomical object from the input medical image using a trained machine learning based segmentation network; and
  outputting results of the segmentation,
  wherein the trained machine learning based segmentation network is trained by:
    receiving a set of medical images, each depicting the anatomical object, in a first modality;
    for each respective medical image of the set of medical images:
      generating a synthetic image, depicting the anatomical object, in a second modality based on the respective medical image;
      generating one or more augmented images based on the synthetic image;
      performing one or more segmentations of the anatomical object from the one or more augmented images using a machine learning based reference network;
      computing an uncertainty associated with segmenting the anatomical object from the respective medical image by:
        quantifying a quality of each of the one or more segmentations of the anatomical object from the one or more augmented images,
        calculating an average quality based on the quality of each of the one or more segmentations; and
        computing the uncertainty based on a distance between the quality of each of the one or more segmentations and the average quality; and
      determining whether the respective medical image is suitable for training a machine learning based segmentation network based on the uncertainty; and
    training the machine learning based segmentation network based on 1) the suitable medical images of the set of medical images and 2) annotations of the anatomical object determined using a machine learning based teacher network.

* * * * *